US006917875B2

(12) United States Patent
Boysen et al.

(10) Patent No.: US 6,917,875 B2
(45) Date of Patent: Jul. 12, 2005

(54) METHOD AND APPARATUS FOR PROCESSING AND DISPLAY OF DIESEL INJECTION WAVEFORM

(75) Inventors: Dale R. Boysen, Plainwell, MI (US); Scott R. Sebastian, Three Rivers, MI (US); William W. Wittliff, III, Gobles, MI (US); Martin P. Franz, Portage, MI (US)

(73) Assignee: SPX Corporation

( * ) Notice: Subject to any disclaimer, the term of this patent is extended or adjusted under 35 U.S.C. 154(b) by 47 days.

(21) Appl. No.: 10/606,892

(22) Filed: Jun. 27, 2003

(65) Prior Publication Data

US 2004/0267438 A1 Dec. 30, 2004

(51) Int. Cl.[7] .................................................. G06G 7/70
(52) U.S. Cl. ...................... 701/114; 701/102; 701/29; 701/35; 701/115; 73/116; 73/117.3; 73/23.32; 73/23.33; 60/276; 340/632; 340/633; 340/634
(58) Field of Search ............................. 701/29, 35, 101, 701/102, 114, 115; 73/116, 117.3, 118.1, 118.2, 23.32, 23.33; 60/276; 340/632–634

(56) References Cited

U.S. PATENT DOCUMENTS

| 5,257,190 | A | * | 10/1993 | Crane ........................... 701/35 |
| 6,009,360 | A | * | 12/1999 | Knapp ........................... 701/29 |
| 6,055,468 | A | * | 4/2000 | Kaman et al. ................. 701/29 |
| 6,308,130 | B1 | * | 10/2001 | Vojtisek-Lom ............... 701/114 |
| 6,470,732 | B1 | * | 10/2002 | Breton ....................... 73/23.31 |
| 6,721,649 | B2 | * | 4/2004 | Knott et al. ................. 701/114 |

* cited by examiner

Primary Examiner—Tony M. Argenbright
Assistant Examiner—Johnny H. Hoang
(74) Attorney, Agent, or Firm—Baker & Hostetler, LLP (57) ABSTRACT

A signal processing apparatus for detecting and displaying the properties of diesel fuel powered compression-ignition engines senses strain pulses in the fuel injection rail structure to perform a variety of testing functions. Among other capabilities, the apparatus permits the user to establish stroboscope timing, to measure engine RPM, to view the relationship between crankshaft position and injection time, and to examine the time-dependent properties of strain pulses on individual fuel injectors in order to evaluate the condition of the diesel engine.

21 Claims, 5 Drawing Sheets

METHOD AND APPARATUS FOR PROCESSING AND DISPLAY OF DIESEL INJECTION WAVEFORM

FIELD OF THE INVENTION

The present invention relates generally to vehicular test equipment. More particularly, the invention relates to detectors and processing procedures for analysis of diesel engine timing events.

BACKGROUND OF THE INVENTION

It is known in vehicular test equipment to use gasoline engine spark plug electrical pulses as timing triggers for analysis of time-sensitive engine operations. Numerous events in spark-ignited gasoline engines, such as crankshaft angular position, engine rotation rate (generally referred to as RPM, the abbreviation for its units, revolutions per minute), valve timing, details of fuel flow and fuel injector function, and emission control functions are monitored or initiated using the firing time of a spark plug—typically the plug designated as "number one"—to trigger such test tools as a tachometer, a strobe light, or a modern processor-controlled multiple-function test instrument.

Spark events detected for triggering and analysis are commonly high-voltage pulses, appearing at, the secondary windings of stepup transformers, driving high-resistance wires to cause arcs to be formed at spark plugs. A variety of technologies have been developed to allow these potentially destructive pulses to actuate sensitive electronics, including resistive or capacitive voltage dividers that block all but a small fraction of the voltage; inductive clamps that use the current in the pulse to energize a miniature transformer temporarily installed around the spark plug wire; so-called Hall Effect probes that directly alter another electric current using the magnetic field associated with the current pulse; and other technologies of greater or lesser reliability and ease of use. Some of these technologies permit the waveform from the secondary winding to be evaluated in detail as an indication of the condition of the engine parts used for that pulse. With some technologies, it can be possible to identify faulty wires, stepup transformers (known in the art as coils), and coil primary circuits, as well as spark plug fouling and other phenomena, based on details of the secondary waveform.

Generating a trigger function for the monitoring of similar events in engines not dependent on spark plugs for initiating combustion, such as diesel engines, is a separate challenge. For diesel engines, ignition takes place spontaneously in the high compression environment of the cylinder with the piston at the proper location with respect to top-dead-center (TDC) after a charge of diesel fuel is injected into the cylinder. Operational testing and emissions testing requirements for diesels have become increasingly stringent, so improved ability to apply existing test apparatus to diesels is a growing demand.

Stand-alone testers exist that can detect one or another phenomenon associated with diesel operation and can generate electronic signals for such purposes as activating strobe lights for testing the timing relationship between crankshaft angle and fuel injection event. However, the greater capabilities associated with test equipment for spark-ignited gasoline-fueled engines are in general not available to the technician testing diesel engines.

SUMMARY OF THE INVENTION

Accordingly, there is a need in the art for an apparatus and method for adapting test equipment intended for spark-ignited gasoline engines to provide at least some of the test equipment's functional capability for use with diesel engines. This need has been met to at least some degree by a novel detection circuit and associated adaptations to a control sequence for a computer-controlled test apparatus.

In accordance with one embodiment of the present invention, an apparatus for sensing and incorporating a synchronizing event from a diesel engine into an engine analyzer comprises an engine analyzer with input ports, with the analyzer capable of responding to the signals applied to its input ports; a transducer to convert a sensed transient physical phenomenon into an electrical signal; and a signal conditioner to transform the output electrical signal of a transducer into a signal at a level compatible with an input into an engine analyzer.

In accordance with another aspect of the present invention, an apparatus for sensing and incorporating a synchronizing event from a diesel engine into an engine analyzer comprises means for sensing transient mechanical strain events in a tube; means for converting a detected strain event from a mechanical to an electrical phenomenon; means for amplifying and conditioning an electrical phenomenon into a conventional electrical signal comparable to one normally used to provide an input to a unit of engine test apparatus; means for recognizing within a unit of engine test apparatus a signal originating from a transient mechanical strain; and means for displaying within a unit of test apparatus a signal originating from a transient mechanical strain.

In accordance with still another aspect of the present invention, a method for sensing and incorporating a synchronizing event from a diesel engine into an engine analyzer comprises sensing transient mechanical strain events in a metallic tube carrying engine fuel; converting a detected transient strain event from a mechanical to an electrical phenomenon; amplifying and conditioning a transient electrical phenomenon into a conventional electrical signal comparable to one normally used to provide an input to a unit of engine test apparatus; recognizing within a unit of engine test apparatus a signal originating from a transient mechanical strain; and displaying within a unit of test apparatus a signal originating from a transient mechanical strain.

There have thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

A compression-ignition, or diesel, engine is a four-stroke cycle or two-stroke cycle engine, typically reciprocating, that is, one that uses pistons and a crankshaft, which engine ignites its charges of fuel by means of the residual heat in the combustion region and the abrupt temperature rise caused by compression of the fuel/air mixture. The principal means for adding air and a fuel charge to the combustion chamber of a diesel engine comprises drawing of air in through a manifold during the intake cycle using the moving piston, possibly augmented by a turbocharger or supercharger, and injection of fuel during the compression cycle using a high-pressure pump, metering valve, and associated apparatus for directing and regulating flows and pressures, a system collectively known in the art as fuel injection. Multiple-cylinder diesel engines commonly employ either a pump per cylinder or a single pump for two or more cylinders and a metering valve per cylinder.

Testing of any engine with modern test equipment, a duty of increasing urgency as emissions standards become increasingly stringent, can require that the event times for various functions be measured with some accuracy, and preferably observed is considerable detail. Test equipment for gasoline-fueled engines, which engines use spark plugs for ignition, can synchronize sampling and display functions using a spark event; diesel engines have no electronic triggering event universally available, and as a consequence many engine testers have no diesel engine test capability.

The apparatus herein described, prior to its adaptation for use with diesel engines, worked with gasoline and other fueled spark-ignited engines. A gasoline engine can have its ignition timing primary (low voltage) or secondary (high voltage) ignition signal used as a trigger. The secondary trigger pulse itself can be displayed on a graphical interface display, thereby potentially revealing to a skilled technician a number of distinct items of information concerning engine operation.

An embodiment in accordance with the present invention uses a piezoelectric transducer to detect the periodic strain applied to a fuel line by surges of diesel fuel forced through the fuel line and into one cylinder of a compression ignition engine by a high-pressure pump. Each fuel line may be dedicated to one cylinder of a multi-cylinder engine. Each surge of fuel may arrive at the piezoelectric transducer at a time determined by a timing system in the engine; the timing system will in some instances not be readily accessible for detection of the basis for the timing, in which case a system of the type described herein may be useful for system testing.

In the same apparatus, following addition of the new components and new software, a physical phenomenon associated with the fuel injection system can be detected and can trigger an electrical signal used as an input into the test apparatus in place of the ignition pulse. The new component can be an amplifier and signal conditioner that uses an input signal from a piezoelectric transducer. The new software can be additional code that optionally modifies the interpretation of the signal waveform generated by the amplifier.

Figure 1:
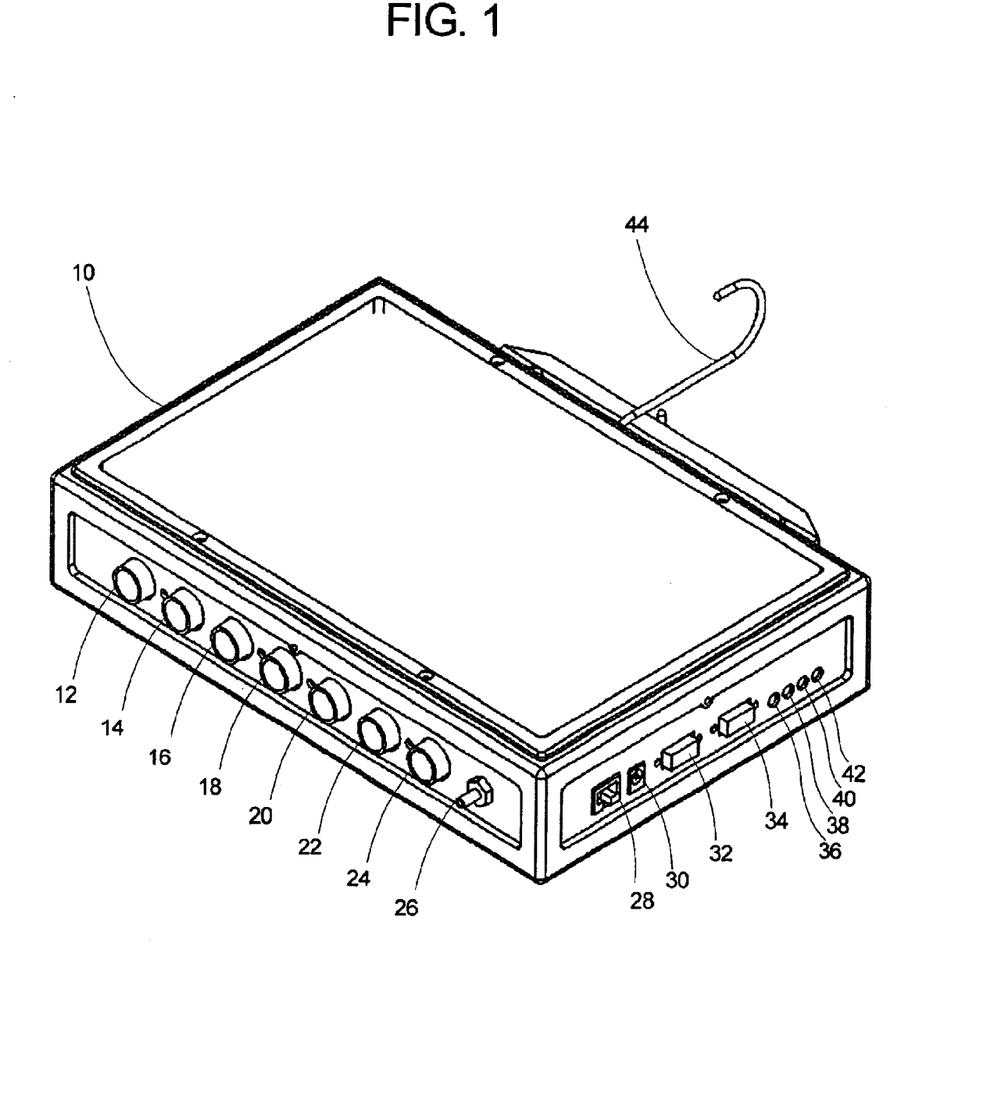
FIG. 1 is an oblique view illustrating a complete assembly of a test apparatus.

As illustrated in FIG. 1, the apparatus includes a housing 10, on which are mounted interface connectors for a secondary scope display 12, a primary scope display 14, amperage sensing 16, a synchronization line 18, a set of spark coil secondary windings 20, a vehicle battery line 22, a timing light output 24, a connection to engine vacuum 26, a connection for Ethernet 28, a power input 30, a first serial port 32, a second serial port 34, and four indicators, a "host" 36 and "comm" 38 that indicate Ethernet port traffic, a "sync" status 40, and a power available indicator 42. FIG. 1 also illustrates a hook 44 by which the apparatus can be suspended if desired.

Figure 2:
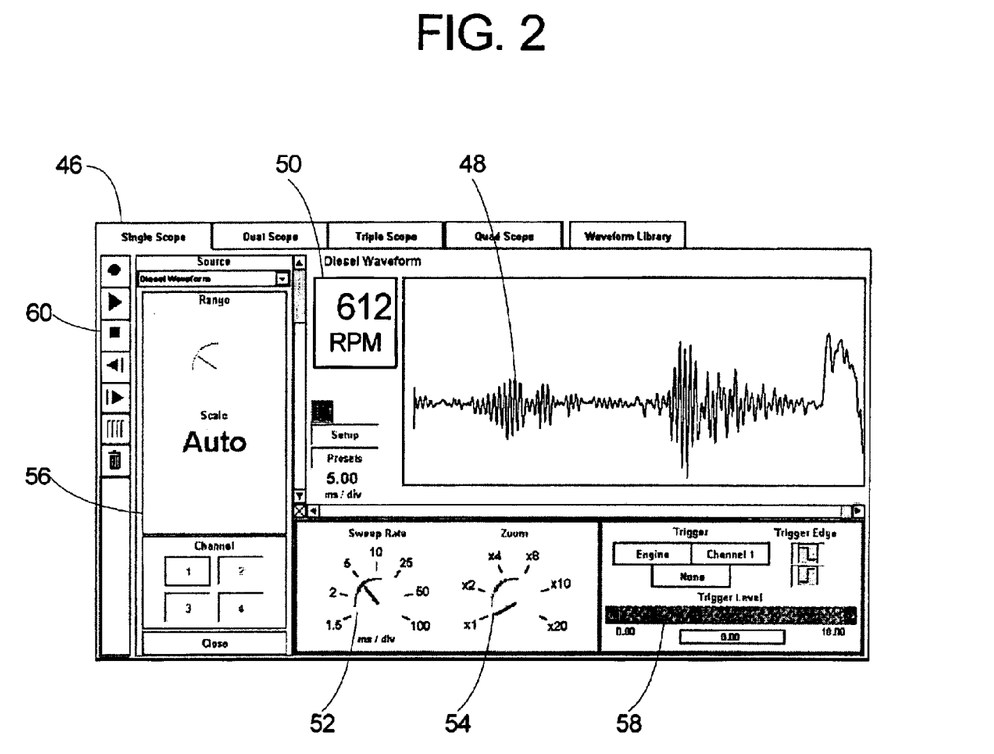
FIG. 2 is a screen display of the test apparatus showing a diesel fuel injector pulse waveform and associated data items.

FIG. 2 shows a display screen 46 with representative content. A first waveform 48 is the curve showing the pressure measured on the fuel injector feed line as a function of time. A first data value 50 is the engine RPM, derived from the fuel injector pulse repetition rate. Since the computer display simulates an oscilloscope, a second data item is the timebase 52 of the simulated oscilloscope, here set to 5 milliseconds per division (msec/div). A third data item is the magnification factor 54, here set to one, while a fourth data item is the vertical magnitude 56, here set to Auto to represent an automatically-adjusted gain that displays the largest signal detected with full vertical amplitude. Triggering function controls 58 also simulate those of conventional oscilloscopes. Recording functions 60 emulate standard recorder control symbols, permitting subsequent replay of events.

Figure 3:
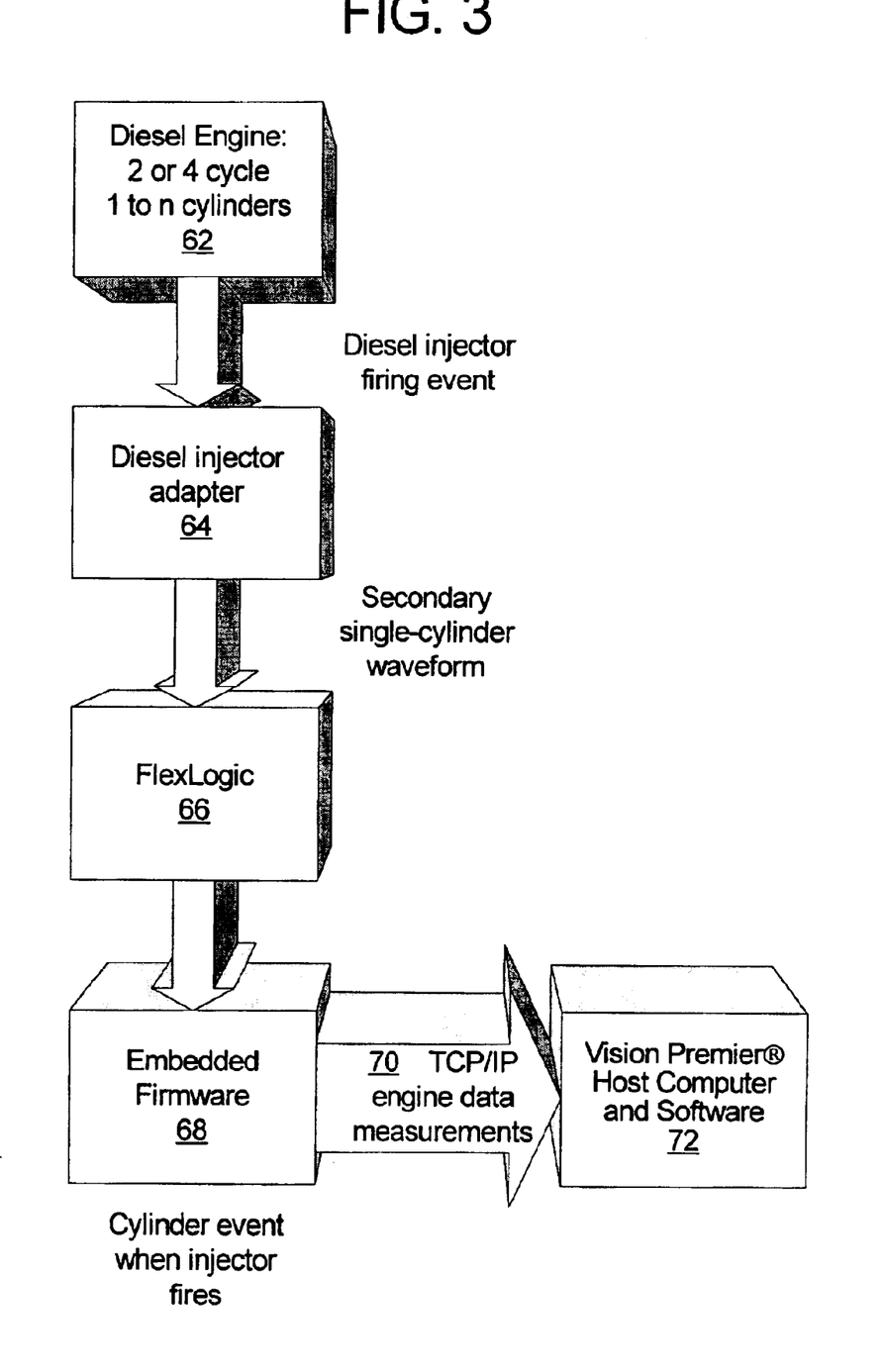
FIG. 3 is a block diagram of a system incorporating a preferred embodiment of the test apparatus.

The block diagram in FIG. 3 illustrates the components that can be used to implement a preferred embodiment of the invention. The diesel engine under test 62 can have any number of cylinders; typical diesel engines have between 4 and 12 cylinders, but the embodiment can be made capable of adapting to any number. As indicated, both 2-cycle and 4-cycle diesels exist, and it is necessary to know which is being tested in order to get the correct RPM value—that is, a representative 2-cycle engine has a fuel injection event into each cylinder for each crankshaft revolution, while a conventional 4-cycle engine injects fuel once every two revolutions.

A diesel injector adapter 64 detects the strain in the fuel line as an analog signal, performs appropriate signal conditioning, and transfers the signal into the pulse processing function 66 within the test apparatus. The processed signal can be evaluated using embedded firmware 68; the output of this process can be a set of data transmitted via transmission control protocol/internet protocol (TCP/IP) 70 within the test apparatus to a host environment 72. Within the host 72, the processed signal can be displayed, evaluated, stored, overlaid with other signals, sent to a remote site, or otherwise manipulated to the limits of the computational hardware and software of the host 72.

Figure 4:
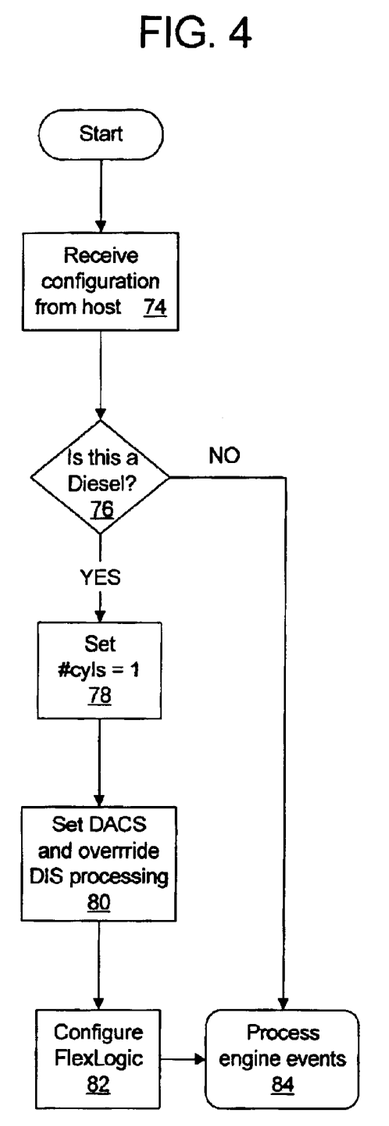
FIG. 4 is a signal flow diagram indicating the software flow that switches the test apparatus from analyzing a spark-ignition to a compression-ignition engine test function.

FIG. 4 summarizes software functions related to conversion from a spark-timed test apparatus to one timed by fuel injector pulses. This procedure can start with a configuration initialization 74 involving a host computer. The next step can be an interaction with the user in the form of a query 76, so that the test apparatus need not have sense capability to differentiate between spark and compression engines. An alternative embodiment can include additional interface connections to encode the identity of the test portal, but the test function 76 in that case is automated, not eliminated. In previous versions of the test apparatus, this test did not exist, so the present "NO" branch was implicit.

In the preferred embodiment, the option to sense the operation of several engine cylinder spark plugs is shown not to be offered, instead setting the number of cylinders to one 78. An alternative embodiment could sense multiple fuel injectors simultaneously, by analogy with the present method for spark-ignition engines, by using a multiplicity of transducers and amplifiers, in which case the step of setting the number of cylinders to one 78 can be replaced by an option based on the actual number. The next step 80 shown disables additional spark-ignition options not relevant for compression-ignition, such as bypassing the function that monitors dual-spark cycles that burn residual hydrocarbons during the exhaust stroke. The final indicated step involves activation in hardware 82 of the program now prepared, which hardware activation may be a product-specific activity equivalent to setting logic switch options. The process can end with an open-ended call 84 to run the test apparatus.

Figure 5:
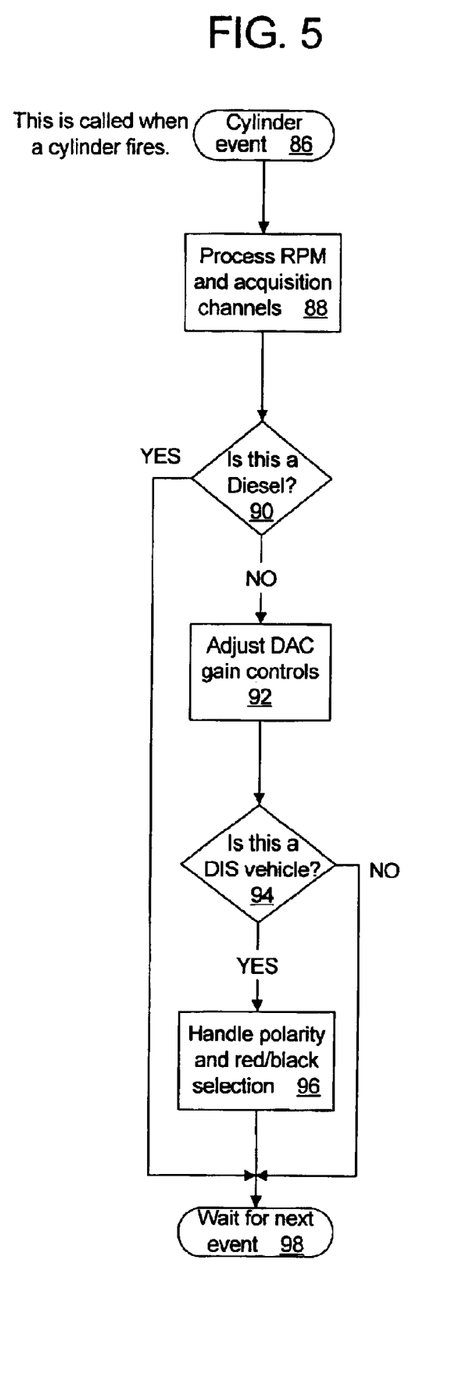
FIG. 5 is a flow summary illustrating the process of capturing a fuel injector pulse for testing an engine.

The flow in FIG. 5 illustrates operation of the test instrument for a normal engine pulse. The sequence can begin with a call to the routine 86 as triggered by a transient event. The software can then add an additional data point to a routine 88 that builds an RPM value by such methods as measuring the time between pulses or counting pulses in an interval; the routine can further direct acquisition of additional periodic data by sampling other available channels, such as analog-to-digital (A/D) ports. Again, a diesel test occurs 90; in this case an affirmative terminates the routine, while a negative calls for converter setup 92, dual-ignition setup 94, and polarity setup 96 relevant to spark ignition engines only. After these routines have been completed, the analysis ends and the routine halts 98 the next pulse.

Figure 6:
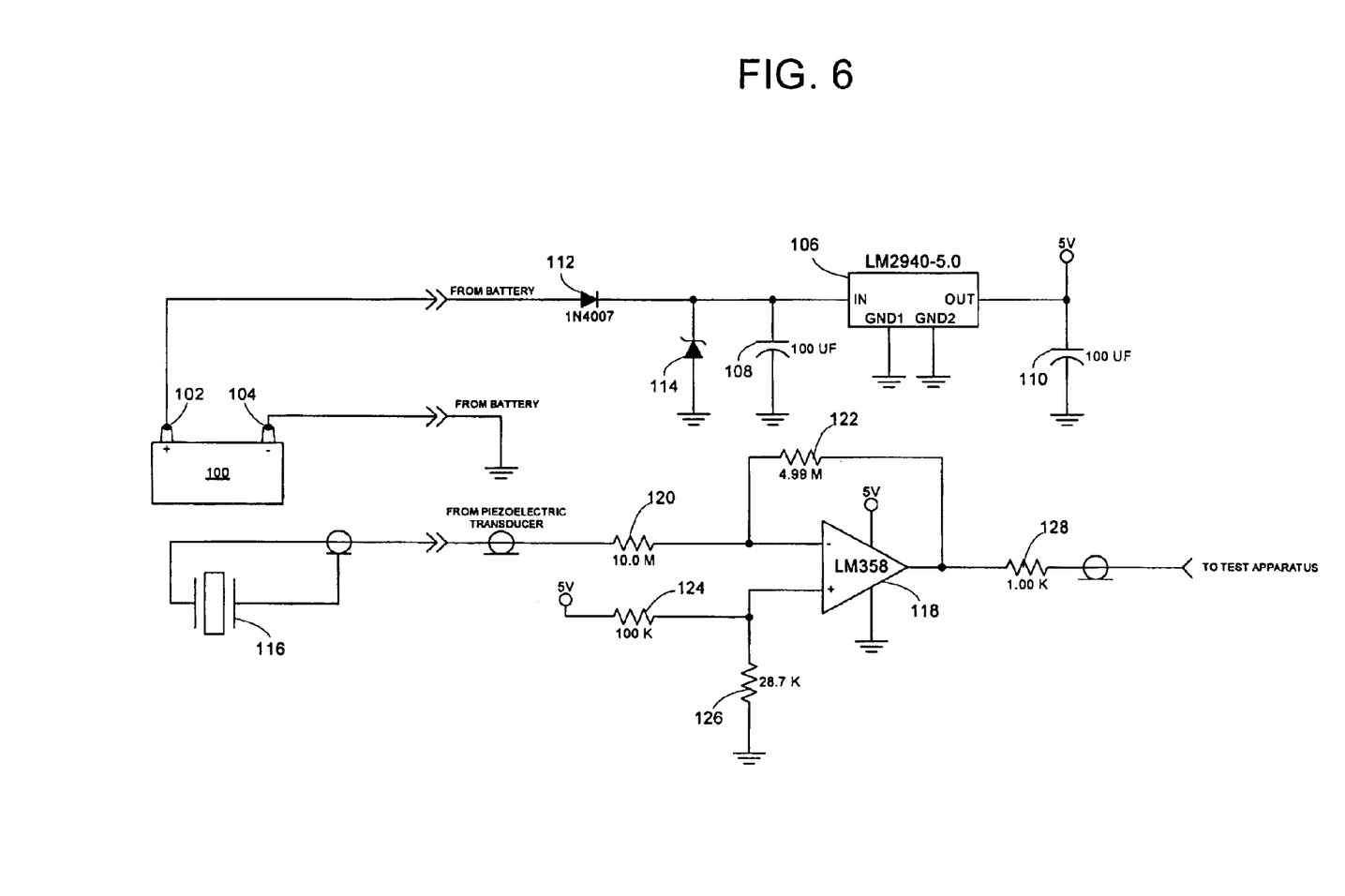
FIG. 6 is a schematic diagram of the pulse capture circuit.

FIG. 6 is a schematic diagram that illustrates the signal conversion circuit used in a preferred embodiment to adapt the test apparatus to the piezoelectric pulse transducer. Power can be taken as shown from the starter battery 100 of the engine under test or another source using battery clips 102 and 104. A basic linear regulator using an LM2940 single-chip regulator integrated circuit (IC) 106 is shown providing high-precision 5-volt direct current (VDC) using input and output capacitors 108 and 110 as well as a reverse-connection isolation diode 112 and a shunt overvoltage protection zener diode 114. Since the representative piezoelectric device 116 emits a comparatively large multiple-volt-level pulse, an LM358 operational amplifier (op amp) 118, with resistors 120–126 to set gain and offset, attenuates and inverts the piezoelectric transducer output signal and holds the op amp output at an intermediate voltage of approximately 1.30 VDC between pulses. Isolation of the op amp output with a 1.0 kilohm resistor 128 protects the op amp from short circuits and establishes the input drive properties appropriate to driving the text apparatus input.

The output pulse from the circuit described above, namely a signal of approximately 1.2 volts peak with a 1.3 VDC offset, driven with a 1.0 kilohm source impedance 128, reasonably approximates the properties of a spark ignition secondary voltage as attenuated within the test apparatus by a voltage divider. That is, the signal is comparable in magnitude and timing to a spark ignition signal. When digitized using an analog-to-digital converter (ADC) within the test apparatus, the circuit can provide a signal that represents the pressure pulse of the fuel injection event in some detail and with some accuracy.

The piezoelectric transducer 116 can sense the initial pressure pulse from the injection circuit, with a gradual tail-off waveform as shown in FIG. 2 indicative of the state of health of the pump and valve, verifying that the injector is not fouled. The ringing or reverberations that may be part of the immediate pulse are artifacts of the physical layout of the specific injector system being tested in the screen view in FIG. 2, with the pulse bouncing off the closed port behind and the open port in front. Other injections systems, differing in layout, can show different patterns of reverberation. Faint traces of the pulses applied to the other cylinders may be seen later on each trace if the time base is set to a long enough interval to include those events.

Alternative embodiments can use different piezoelectric transducers, which may have different response to a specific injector pulse, and may require a different gain setting. Other regulator ICs may be appropriate, and some embodiments may require no regulator. In some embodiments, the amplifier may be configured as a noninverting buffer, or a cascade of two inverters to leave the transducer signal uninverted. Additional isolation and protection elements, such as transient suppression diodes, capacitors, and series resistances may be added to the circuit to protect against electrostatic discharge damage and other risks. Power can be fed from the test apparatus rather than independently tapping an external battery. Mechanical variations can include clamping schemes for attachment to numerous styles of injectors, as well as packaging schemes for the external electronics. Another embodiment incorporates the electronics for capturing the piezoelectric transducer signal into the test apparatus.

The test apparatus and the software that runs it can be programmed to register the high-level signal from the sensor as a timing trigger and to disregard the smaller ones for triggering purposes. For complete analysis, the adapter can be affixed to each fuel line in turn, allowing detailed examination of the pulse applied to each cylinder of the engine. To observe RPM and other basic data, it may be sufficient to affix the adaptor to the "number one" injector only, for example.

The many features and advantages of the invention are apparent from the detailed specification; thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. An apparatus for sensing and reporting a synchronizing event from a diesel engine, comprising:
   an engine analyzer with input ports, said analyzer being capable of responding to the signal applied to its input port and including:
      an input capability comprised of an analog voltage input,
      a display feature that displays the equivalent of an oscilloscope waveform in response to a time-variant analog input voltage signal, a control feature that permits user input of control commands, and a programmable processing capability permitting application of input signals to result in different responses in accordance with changed operational settings;

a transducer to convert a sensed transient physical phenomenon into an electrical signal; and a signal conditioner to transform the output electrical signal of a transducer into a signal at a level compatible with an input into said engine analyzer.

2. The apparatus of claim 1, where said transducer further comprises a sensor that responds to a transient change in applied strain by developing a transient output electrical signal.

3. The apparatus of claim 2, where the output electrical signal of said transducer is electrically equivalent to a measurable quantity of electrical charge on a capacitor discharging through a resistance.

4. The apparatus of claim 2, where said transducer further comprises a piezoelectric sensor.

5. The apparatus of claim 2, where said transducer further comprises a sensor that detects the transient pulses characteristic of a diesel engine fuel line carrying fuel from an injector to the port at which that fuel is injected into a cylinder of a diesel-fueled, compression-ignited engine.

6. The apparatus of claim 2, where said transducer further comprises a sensor that detects the transient pulses characteristic of a diesel engine fuel line carrying fuel to an injector.

7. The apparatus of claim 1, where said signal conditioner further comprises:

an electrically powered circuit that performs voltage regulation on the power voltage fed into said signal conditioner;

an electrically powered circuit that accepts an analog input signal from a piezoelectric transducer into said signal conditioner.

8. The apparatus of claim 1, where said engine analyzer further comprises an embedded software sequence directing a storage element of said engine analyzer to record the impinging transient signal as a sequence of sampled voltage elements at a selectable sampling rate.

9. The apparatus of claim 1, where said engine analyzer further comprises an embedded software sequence to evaluate the properties of an input waveform in such fashion as to distinguish between individual amplitude elements, discriminating between actual fuel rail pulses and false signals, including echoes and reverberations of the line currently under test and coupled signals originating at other locations, whether within the engine under test or not.

10. The apparatus of claim 1, where said engine analyzer further comprises an embedded software sequence that computes and displays engine RPM from the rate of occurrence of detected diesel engine fuel rail pulses.

11. An apparatus for sensing and reporting a synchronizing event from a diesel engine, comprising:

an engine analyzer with input ports, said analyzer being capable of responding to the signal applied to its input port;

transducer to convert a sensed transient physical phenomenon into an electrical signal; and a signal conditioner to transform the output electrical signal of a transducer into a signal at a level compatible with an input into said engine analyzer, said signal conditioner including an electrically powered circuit that adjusts the polarity, quiescent reference voltage level, signal amplitude, and output impedance of an analog input signal to produce an analog output signal proportional to an input signal from a piezoelectric transducer over a range, the output signal further meeting an input level requirement of a unit of test apparatus intended to monitor one or more functions of a fuel-fired reciprocating engine.

12. An apparatus for sensing and reporting a synchronizing event from a diesel engine, comprising:

an engine analyzer with input ports, said analyzer being capable of responding to the signal applied to its input port and including:

an embedded software sequence permitting a user to identify the properties of an input impinging on a standard input port as corresponding to one of a multiplicity of types of external phenomena, an embedded software sequence interpreting a transient electrical signal waveform as a strain signal in a high-pressure fuel line, and an embedded software sequence directing a display element of said engine analyzer to display the impinging transient signal as a time-varying voltage function;

a transducer to convert a sensed transient physical phenomenon into an electrical signal; and a signal conditioner to transform the output electrical signal of a transducer into a signal at a level compatible with an input into said engine analyzer.

13. An apparatus for sensing and reporting a synchronizing event from a diesel engine, comprising:

means for sensing transient mechanical strain events in a tube;

means for converting a detected strain event from a mechanical to an electrical phenomenon;

means for amplifying and conditioning an electrical phenomenon into a conventional electrical signal comparable to one normally used to provide an input to a unit of engine test apparatus;

means for receiving an analog voltage input signal;

means for permitting user input of control commands;

programmable means for permitting application of input signals to result in different responses in accordance with changed operational setting;

means for responding to the input signal; and means for displaying the equivalent of an oscilloscope waveform in response to a time-variant analog input voltage signal.

14. The apparatus of claim 13, comprising means for storing signals derived from detected transient strain events.

15. The apparatus of claim 13, further comprising:

means for retrieving detected transient strain event signals from storage;

means for arranging retrieved subsets of stored data for display; and means for superimposing multiple retrieved data streams in a single display.

16. The apparatus of claim 13, further comprising:

means for discriminating between principal transient strain event signals and successive echoes, reverberations, and other false signals; and means for limiting display of signals to principal signals.

17. The apparatus of claim 13, further comprising means for triggering flashes in stroboscopic timing lights.

18. A method for sensing and reporting a synchronizing event from a diesel engine, comprising the steps of:

sensing transient mechanical strain events in a metallic tube carrying motor fuel;

converting a detected transient strain event from a mechanical to an electrical phenomenon;

adjusting the amplitude and source impedance of a transient electrical phenomenon to correspond to those characteristics as observable in an electrical signal normally used to provide an input to a unit of engine test apparatus;

receiving an analog voltage input signal;

receiving user input of control commands;

applying input signals to result in different responses in accordance with changed operational settings;

responding to the input signal; and displaying the equivalent of an oscilloscope waveform in response to a time-variant analog input voltage signal.

19. The method of claim 18, further comprising:

recognizing within a unit of engine test apparatus a signal originating from a transient mechanical strain; and displaying within a unit of test apparatus a signal originating from a transient mechanical strain.

20. The method of claim 18, further comprising:

storing a signal representing a transient mechanical strain;

reformatting a signal representing a transient mechanical strain for display with alternative time base and amplitude representation; and displaying a multiplicity of such stored and reformatted transient mechanical strain signals simultaneously to promote and simplify comparison between such signals.

21. The method of claim 18, further comprising:

generating an output signal in response to the occurrence of a transient mechanical strain, wherein the output signal is a trigger to a stroboscopic light.

* * * * *

UNITED STATES PATENT AND TRADEMARK OFFICE
CERTIFICATE OF CORRECTION

PATENT NO.   : 6,917,875 B2
DATED        : July 12, 2005
INVENTOR(S)  : Dale R. Boysen et al.

It is certified that error appears in the above-identified patent and that said Letters Patent is hereby corrected as shown below:

Column 7,
Line 60, please replace "port" with -- ports --;
Line 61, please insert -- a -- before "transducer";

Column 8,
Line 12, please replace "port" with -- ports --.

Signed and Sealed this

Sixth Day of September, 2005

JON W. DUDAS
*Director of the United States Patent and Trademark Office*